(12) United States Patent
Takata

(10) Patent No.: US 7,969,099 B2
(45) Date of Patent: *Jun. 28, 2011

(54) LIGHTING DEVICE FOR DISPLAY DEVICE, DISPLAY DEVICE AND TELEVISION RECEIVER

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

This patent is subject to a terminal disclaimer.

(21) Appl. No.: 12/488,679

(22) Filed: Jun. 22, 2009

(65) Prior Publication Data

US 2009/0256789 A1    Oct. 15, 2009

Related U.S. Application Data

(63) Continuation of application No. 12/123,589, filed on May 20, 2008, now Pat. No. 7,615,935, which is a continuation of application No. PCT/JP2007/070057, filed on Oct. 15, 2007.

(30) Foreign Application Priority Data

Feb. 15, 2007    (JP) .................................. 2007-035192

(51) Int. Cl.
*H05B 37/00* (2006.01)
(52) U.S. Cl. ...................... 315/229; 315/335; 315/169.3; 362/225
(58) Field of Classification Search ........ 315/227 R–235, 315/169.1–169.3, 324; 313/237, 238, 249, 313/497, 632, 634; 362/31, 217, 225, 227, 362/97, 1, 249, 611, 634
See application file for complete search history.

(56) References Cited

U.S. PATENT DOCUMENTS

| | | | |
|---|---|---|---|
| 6,674,250 B2 | 1/2004 | Cho et al. | |
| 6,796,678 B2* | 9/2004 | Moon | 362/225 |
| 6,946,796 B2* | 9/2005 | Yamamoto et al. | 313/607 |
| 6,960,891 B2* | 11/2005 | Park et al. | 315/229 |
| 7,615,935 B2* | 11/2009 | Takata | 315/229 |
| 2001/0024260 A1 | 9/2001 | Kitada | |
| 2002/0130628 A1 | 9/2002 | Shin | |
| 2003/0218877 A1 | 11/2003 | Moon | |

(Continued)

FOREIGN PATENT DOCUMENTS

| | | |
|---|---|---|
| EP | 1 699 273 A2 | 9/2006 |
| JP | 2006-245005 A | 9/2006 |

OTHER PUBLICATIONS

Takata; "Lighting Device for Display Device, Display Device and Television Receiver"; U.S. Appl. No. 12/123,589, filed May 20, 2008.

(Continued)

*Primary Examiner* — Jacob Y Choi
*Assistant Examiner* — Jimmy T Vu
(74) *Attorney, Agent, or Firm* — Keating & Bennett, LLP

(57) ABSTRACT

A lighting device for a display device includes a plurality of light sources, a power source arranged to provide drive power for the light sources, a common electrode arranged to supply the drive power to the plurality of light sources, a plurality of holder electrodes arranged to hold the respective light sources and supply the drive power from the common electrode individually to the respective light sources, and a dielectric portion provided between the common electrode and each of the holder electrodes.

13 Claims, 18 Drawing Sheets

U.S. PATENT DOCUMENTS

2006/0023471 A1 2/2006 Ahn et al.
2006/0072322 A1 4/2006 Lee et al.
2006/0284560 A1* 12/2006 Park et al. .................... 313/634
2006/0286831 A1 12/2006 Kwon et al.

OTHER PUBLICATIONS

Official Communication issued in corresponding European Patent Application No. 07829791.8, mailed on Nov. 22, 2010.

* cited by examiner

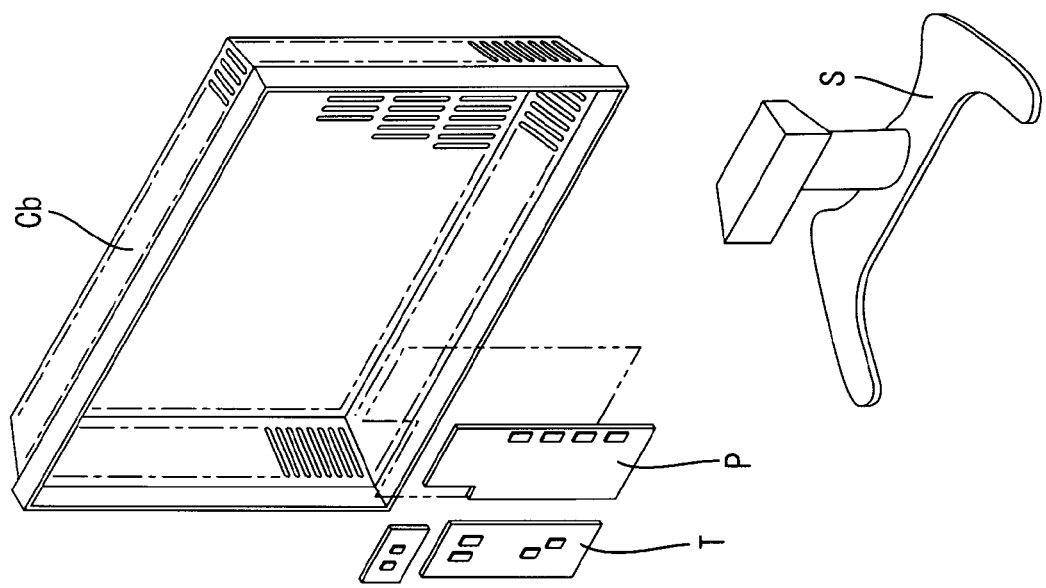
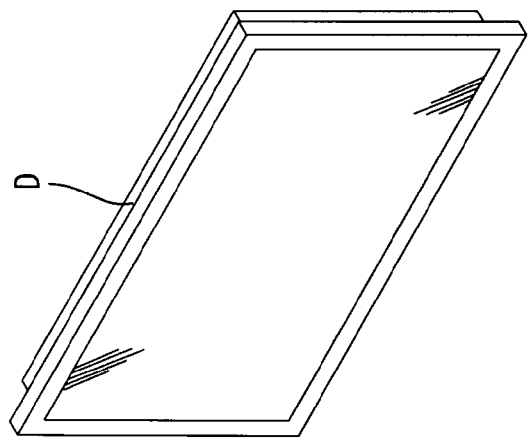
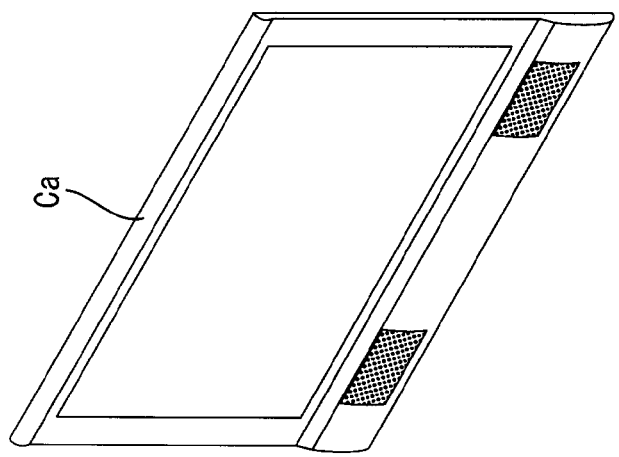
FIG11

– 1 –

LIGHTING DEVICE FOR DISPLAY DEVICE, DISPLAY DEVICE AND TELEVISION RECEIVER

CROSS REFERENCE TO RELATED APPLICATION

The present application is a continuation application of U.S. patent application Ser. No. 12/123,589 filed on May 20, 2008, which is a continuation of International Application No. PCT/JP2007/070057 filed Oct. 15, 2007, which claims priority from Japanese Patent Application No. 2007-035192 filed Feb. 15, 2007. The entire contents of these applications are incorporated herein by reference.

BACKGROUND OF THE INVENTION

1. Field of the Invention

The present invention relates to a lighting device for a display device, a display device and a television receiver.

2. Description of the Related Art

In a display device having non-luminous optical elements as typified by a liquid crystal display device, a backlight device is provided on the backside of a display panel such as a liquid crystal panel, so as to illuminate the display panel (as shown in JP-A-2006-245005, for example).

The backlight device, disclosed in JP-A-2006-245005, has a structure that enables parallel drive for CCFLs. That is, a lamp drive device is disclosed in JP-A-2006-245005, which includes a plurality of cold cathode fluorescent lamps connected in parallel, a first current limiting unit connected to the plurality of CCFLs for controlling the magnitude of power to be supplied so as to discharge the CCFLs, and an inverter for changing the magnitude of received AC power and supplying the changed AC power to the first current limiting unit. The parallel drive structure for CCFLs enables minimization of defective fraction as well as reduction in production costs of CCFLs. However, JP-A-2006-245005 fails to disclose the details of the structure. That merely discloses that the first current limiting unit specifically includes ballast capacitors.

SUMMARY OF THE INVENTION

In order to overcome the problems described above, preferred embodiments of the present invention enable parallel drive for light sources by a simplified parallel drive structure so as to contribute to large cost reduction, and thereby provide a failure-resistant and highly-reliable lighting device for a display device. In addition, preferred embodiments of the present invention provide a display device having the lighting device for a display device, and provide a television receiver having the display device.

In order to solve the above-described problems with the prior art, a lighting device for a display device according to a preferred embodiment of the present invention includes a plurality of light sources, a power source arranged to provide drive power for the light sources, a common electrode arranged to supply the drive power to the plurality of light sources, a plurality of holder electrodes arranged to hold the respective light sources and supplying the drive power from the common electrode individually to the respective light sources, and a dielectric portion provided between the common electrode and each of the holder electrodes. The common electrode, the holder electrode and the dielectric portion are provided on the same substrate.

According to this construction, the lighting device for a display device includes electrodes, to which drive power is supplied via the common electrode and the dielectric portion, and from which the drive power is supplied individually to the respective light sources. The electrodes are provided as holder electrodes capable of holding the respective light sources, i.e., provided as a simplified construction in which a holder function and an electrode function for light sources are combined. Thereby, the trouble of wiring or installation of light sources can be saved, and therefore manufacturing efficiency could be improved, resulting in contribution to cost reduction. Further, wiring or mounting-related failures are unlikely to occur, which could result in a highly-reliable lighting device for a display device.

Moreover, the dielectric portion is provided between the common electrode and each holder electrode. Thereby, a capacitance is provided between the power source and each light source, and consequently parallel drive for the light sources is allowed. That is, the drive power from the power source is supplied to the common electrode at a common voltage level, while the drive power therefrom is supplied, via the dielectric portion, individually to the respective holder electrodes and therefore to the respective light sources which are connected in parallel thereto. Consequently, the drive power can be supplied to each light source at a proper level, because the capacitance adjusts (or limits) the voltage level.

Thus, according to a preferred embodiment of the present invention, parallel drive for light sources can be achieved by a simple construction including holder electrodes, resulting in contribution to cost reduction for a lighting device for a display device and therefore cost reduction for a display device.

The light source can be formed of a discharge tube. The level of a voltage to be supplied to the light source formed of a discharge tube should be adjusted individually. According to a preferred embodiment of the present invention, the intervening dielectric portion is provided, and thereby the level of a voltage to be supplied to the light source can be adjusted suitably.

The power source can include an inverter circuit that generates a high-frequency voltage.

According to a preferred embodiment of the present invention, a voltage can be supplied at a fixed level to the common electrode. Therefore, the present invention is suitable for a construction including an inverter circuit that generates a high-frequency voltage, because the need for inverter circuits provided individually for the light sources can be eliminated resulting in a simple construction.

The common electrode can be provided so as to be capable of supplying the drive power concurrently to the plurality of light sources.

According to a preferred embodiment of the present invention, the common electrode is arranged so as to be connected to the respective light sources via the dielectric portion and the respective holder electrodes. Thereby, the common electrode is allowed to supply drive power concurrently to the plurality of light sources, and therefore drive power can be supplied from the power source to the common electrode at a predetermined level. Consequently, the number of above-described inverter circuits can be reduced to one, for example. Thus, the construction of the lighting device for a display device can be simplified.

The light source can include a terminal for receiving supply of the drive power, while the holder electrode can be arranged so as to be capable of holding the terminal and supplying the drive power via the terminal.

If the terminal of a light source and a holder electrode capable of holding the terminal are thus provided, wiring can be eliminated and thereby the construction for light source drive can be greatly simplified.

The light source can include a terminal for receiving supply of the drive power, while the holder electrode can be formed of a conductive clip member capable of holding the terminal.

If the terminal of a light source and a holder electrode formed of a conductive clip member capable of holding the terminal are thus provided, wiring can be eliminated and thereby the construction for light source drive can be greatly simplified.

The light source can be provided as a linear light source, so that terminals for receiving supply of the drive power are provided on respective ends of the linear light source while the holder electrode is provided for each of the terminals on the respective ends.

According to the construction in which the holder electrodes of preferred embodiments of the present invention are thus arranged so as to hold the terminals on the respective ends of a linear light source, a voltage can be applied to the ends of the light source in a balanced manner, resulting in improved luminous efficiency.

The light source can include a straight glass tube, outer leads projecting linearly from respective ends of the glass tube and coaxially with the glass tube, and ferrules which are electrically connected to the outer leads and are mounted to respective end portions of the glass tube so as to form the above terminal.

In the case that each light source thus includes outer leads and ferrules on the respective ends of its straight glass tube, according to a preferred embodiment of the present invention which includes holder electrodes, installation and electrical connection of the light sources can be simultaneously achieved. Further, parallel drive for the light sources is allowed, because the common electrode is arranged so as to be connected to the holder electrodes via the dielectric portion. Thus, the construction can be simplified, resulting in further contribution to cost reduction.

The dielectric portion can be a dielectric film provided between the common electrode and the holder electrode.

According to this construction, the capacitance can be formed readily and reliably. If the holder electrodes are provided specifically on the dielectric film that can be formed on the common electrode in layers, manufacturing efficiency can be further improved, resulting in contribution to cost reduction.

The dielectric portion can be a capacitor chip provided between the common electrode and the holder electrode.

According to this construction, the capacitance can be formed readily and reliably. Manufacturing efficiency can be further improved particularly due to capacitor chips, resulting in contribution to cost reduction.

A chassis for containing the light source, and a circuit board disposed on the opposite side of the chassis from the light source can be further included, so that the common electrode, the holder electrode and the dielectric portion are formed on the circuit board while an insulating member is provided between the chassis and the circuit board.

The circuit board including the common electrode and the holder electrode may generate or provide a high-frequency voltage. Therefore, it is preferable to provide an insulating member in order to prevent or suppress electrical leakage, or the like, into the chassis. If the chassis is specifically formed of a metallic plate or the like, the effect of providing the insulating member can be further pronounced because of the conductivity of the chassis.

In addition, the circuit board can reach high temperature due to the high-frequency voltage. In view of this, a heat insulating member may be provided between the circuit board and the chassis. In this case, an electrical and heat insulating member can be used, for example.

A chassis for containing the light source, and a circuit board disposed on the opposite side of the chassis from the light source can be further included, so that the common electrode, the holder electrode and the dielectric portion are formed on the circuit board while an opening is formed on the chassis so as to overlap with the circuit board.

The circuit board including the common electrode and the holder electrode may generate or provide a high-frequency voltage. Therefore, it is preferable to provide an opening in order to prevent or suppress electrical leakage, or the like, into the chassis. If the chassis is specifically formed of a metallic plate or the like, the effect of providing the opening can be further pronounced because of the conductivity of the chassis.

A chassis for containing the light source, and a circuit board disposed on the opposite side of the chassis from the light source can be further included, so that the common electrode, the holder electrode and the dielectric portion are formed on the circuit board while a depressed portion lower than the other portions is formed on the chassis so as to overlap with the circuit board.

The circuit board including the common electrode and the holder electrode may generate or provide a high-frequency voltage. Therefore, in order to prevent or suppress electrical leakage, or the like, into the chassis, it is preferable to provide a depressed portion so as to keep a distance therefrom. If the chassis is specifically formed of a metallic plate or the like, the effect of providing the depressed portion can be further pronounced because of the conductivity of the chassis.

In order to solve the above problems, a display device according to another preferred embodiment of the present invention includes the above-described lighting device for a display device according to preferred embodiments of the present invention described above, and a display panel for providing display by use of light from the lighting device for a display device.

In the case of a display device having the above construction, cost reduction and reliability improvement can be achieved for the lighting device for a display device, and therefore cost reduction and reliability improvement can be also achieved for the display device A liquid crystal panel can exemplify the above display panel. The display device as a liquid crystal display device has a variety of applications, such as a television display or a personal-computer display. Particularly, it is suitable for a large screen display.

A television receiver according to a preferred embodiment of the present invention includes the above display device.

According to this construction, a highly-reliable television receiver can be provided inexpensively.

As mentioned above, the preferred embodiments of the present invention enable parallel drive for light sources by a simplified parallel drive structure, so as to contribute to large cost reduction. Thereby, a failure-resistant and highly-reliable lighting device for a display device can be provided. Further, an inexpensive and highly-reliable display device having the lighting device for a display device, and an inexpensive and highly-reliable television receiver having the display device can be provided.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 11 is an exploded perspective view of a preferred embodiment of a television receiver.

DETAILED DESCRIPTION OF THE PREFERRED EMBODIMENTS

Hereinafter, preferred embodiments of the present invention will be explained with reference to the drawings.

Figure 1:
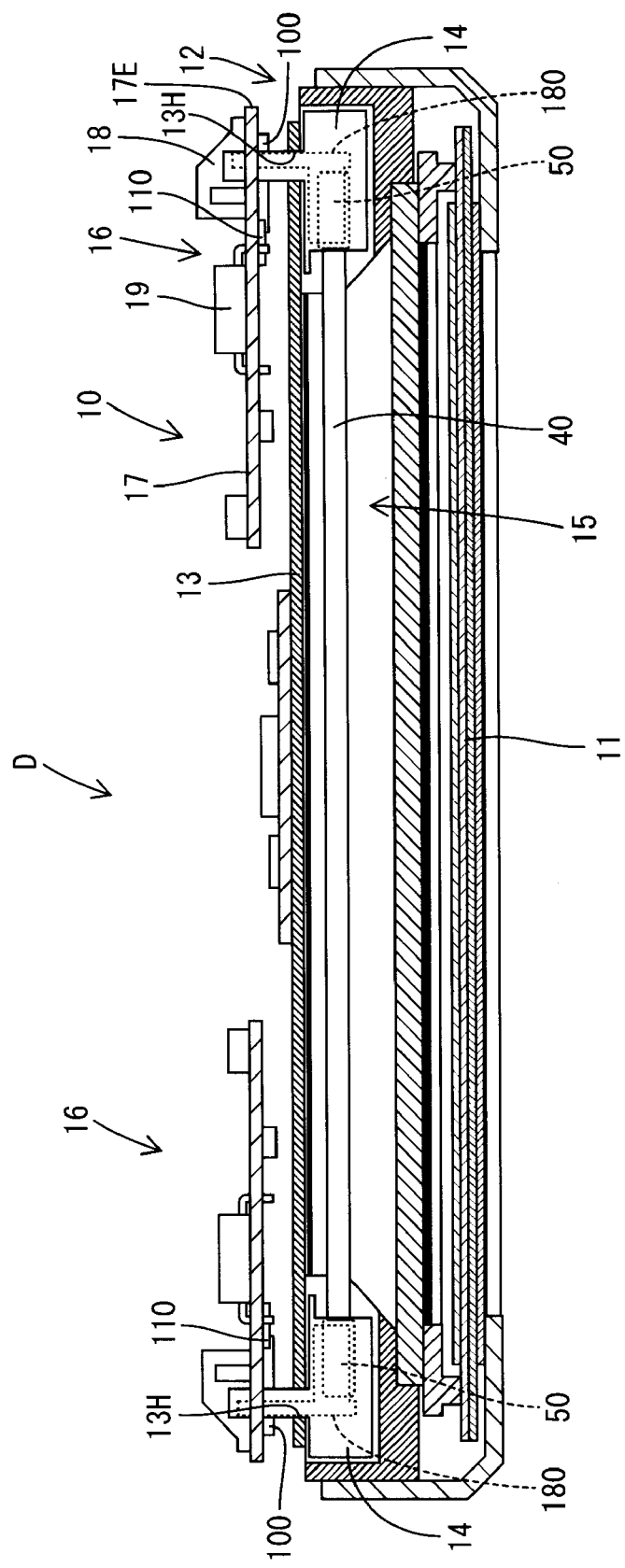
FIG. 1 is a horizontal sectional view of a liquid crystal display device (a display device) according to a preferred embodiment of the present invention.
Figure 2:
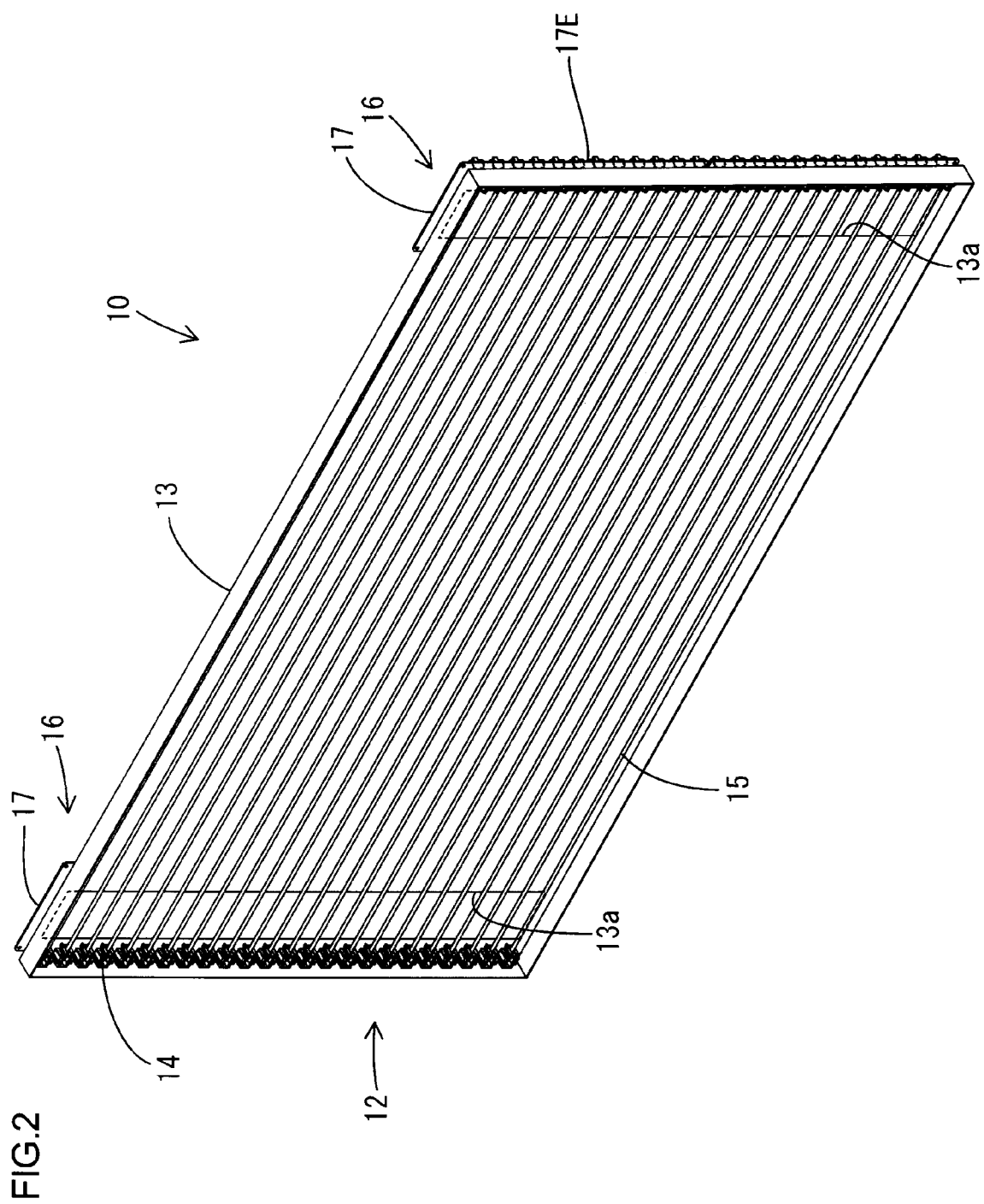
FIG. 2 is a perspective view of a lighting device (a lighting device for a display device) included in the liquid crystal display device.
Figure 3:
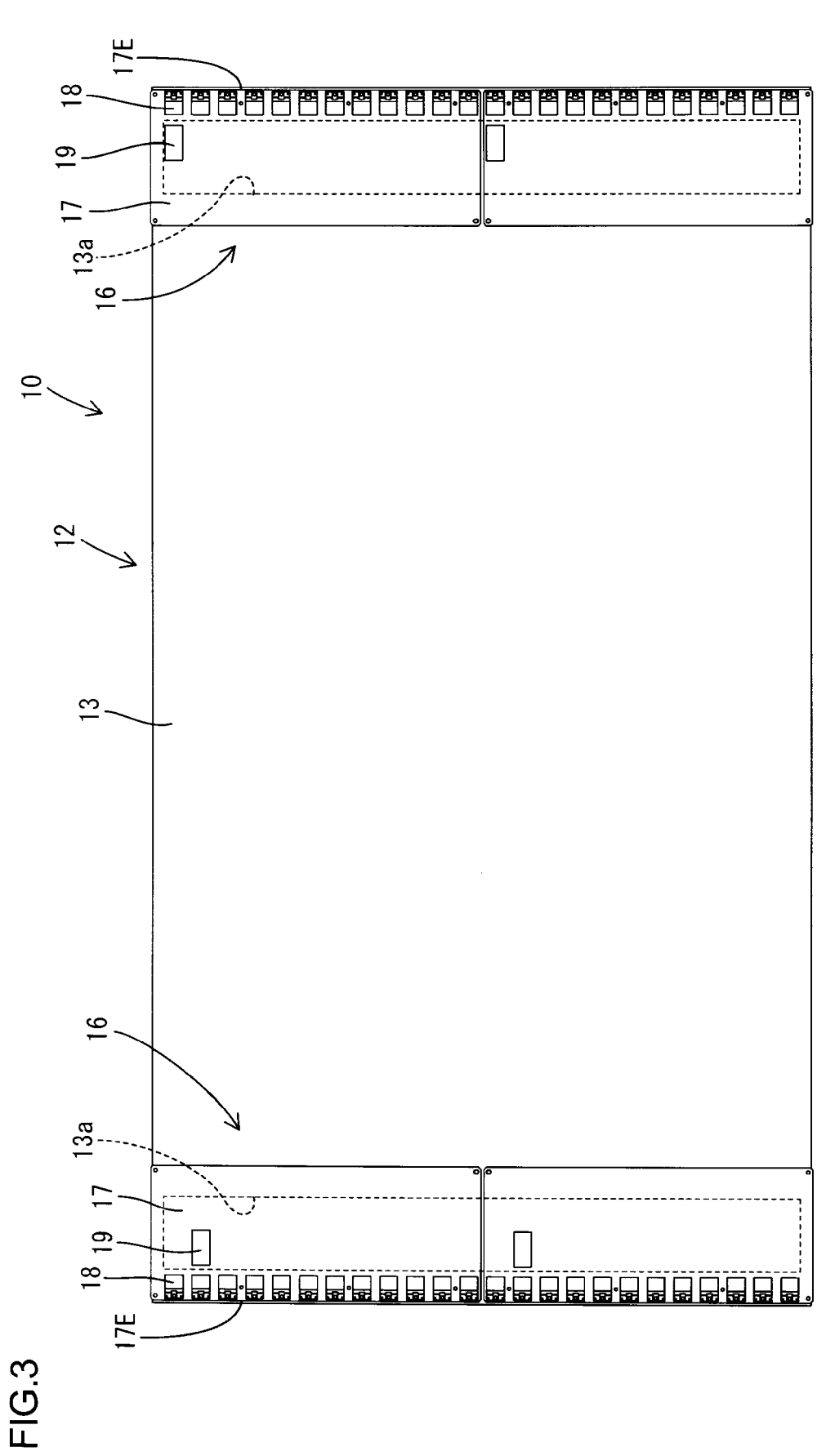
FIG. 3 is a rear elevational view of the lighting device.
Figure 4:
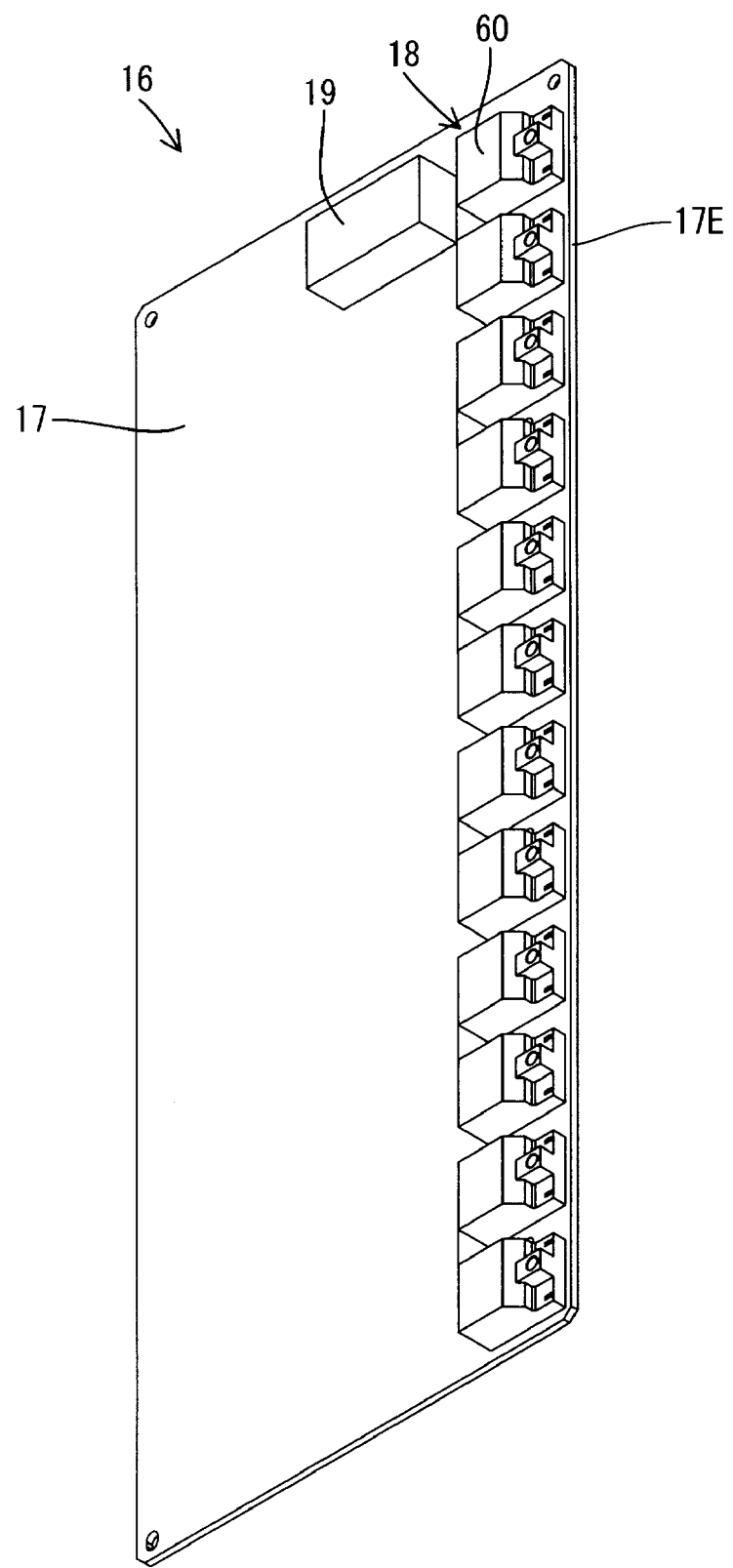
FIG. 4 is a perspective view of a power board (circuit board) included in the lighting device.
Figure 5:
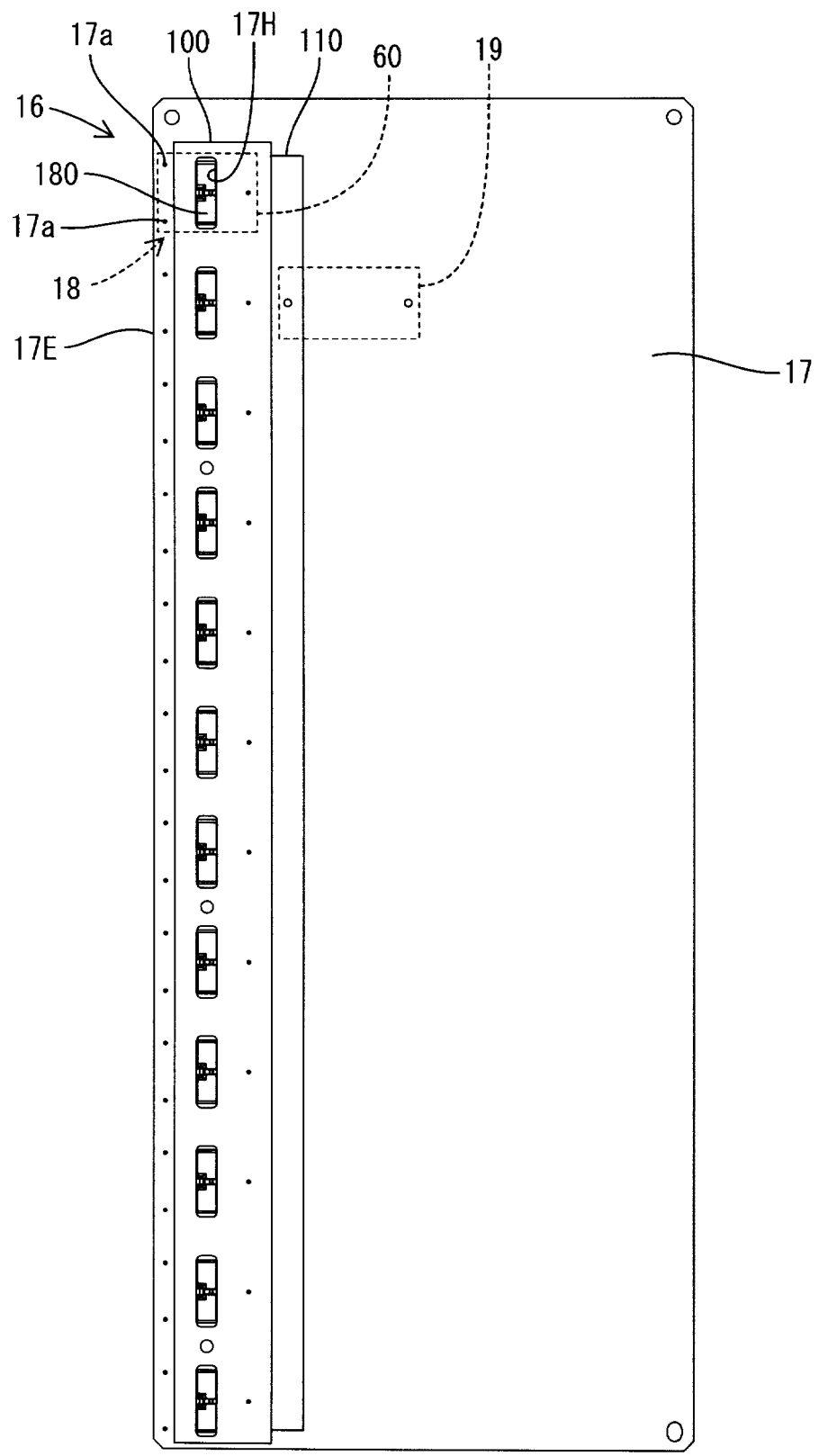
FIG. 5 is a front elevational view of the power board.
Figure 6:
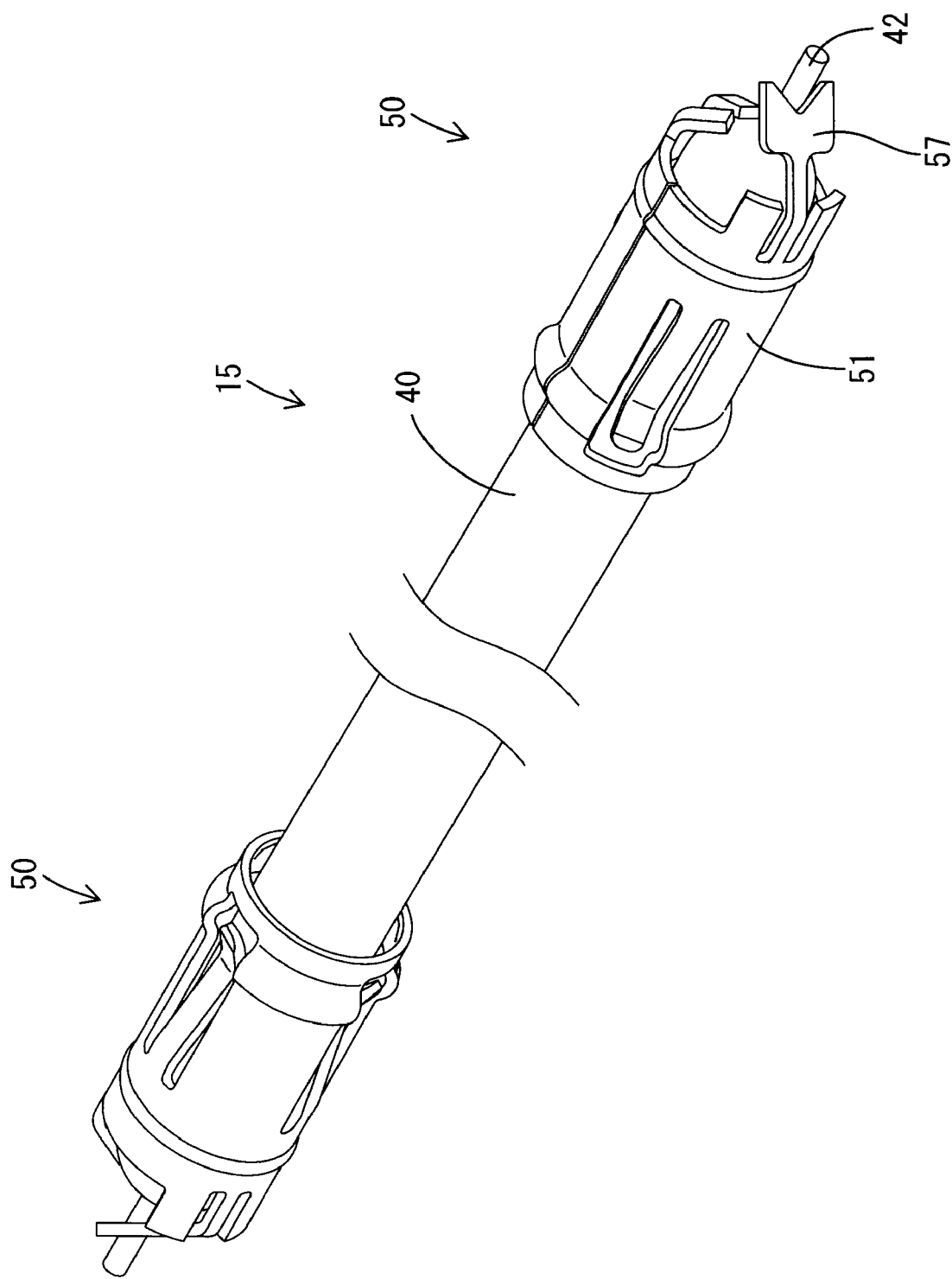
FIG. 6 is a perspective view of a discharge tube.
Figure 7:
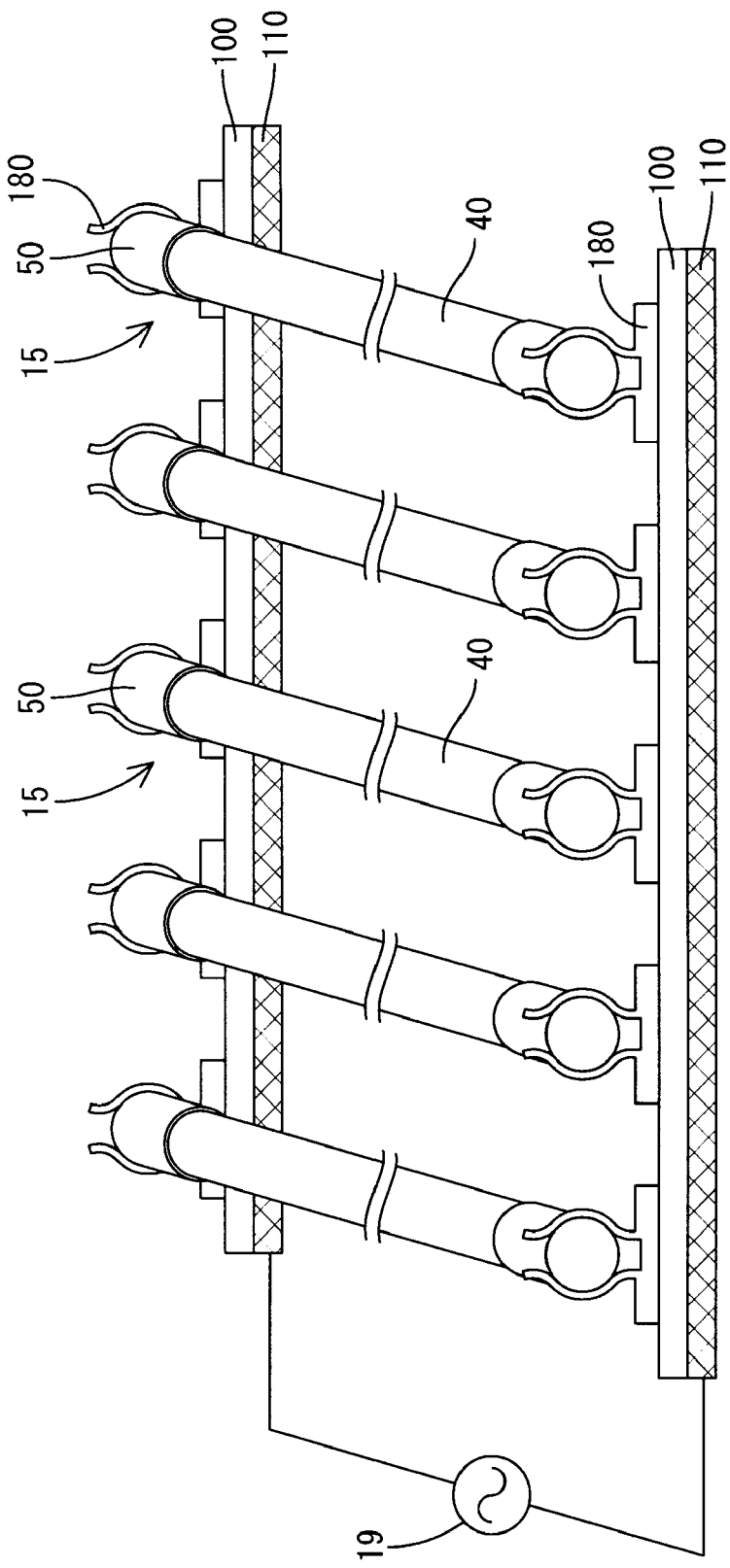
FIG. 7 is an explanatory diagram schematically showing a drive power supply structure for discharge tubes.

FIG. 1 is a horizontal sectional view of a liquid crystal display device (a display device) D of the present preferred embodiment. FIG. 2 is a perspective view of a lighting device (a lighting device for a display device) 10 included in the liquid crystal display device D. FIG. 3 is a rear elevational view of the lighting device 10. FIG. 4 is a perspective view of a power board (a circuit board) 16 included in the lighting device 10. FIG. 5 is a front elevational view of the power board 16. FIG. 6 is a perspective view of a discharge tube 15. FIG. 7 is an explanatory diagram schematically showing a drive power supply structure for discharge tubes 15.

Figure 8:
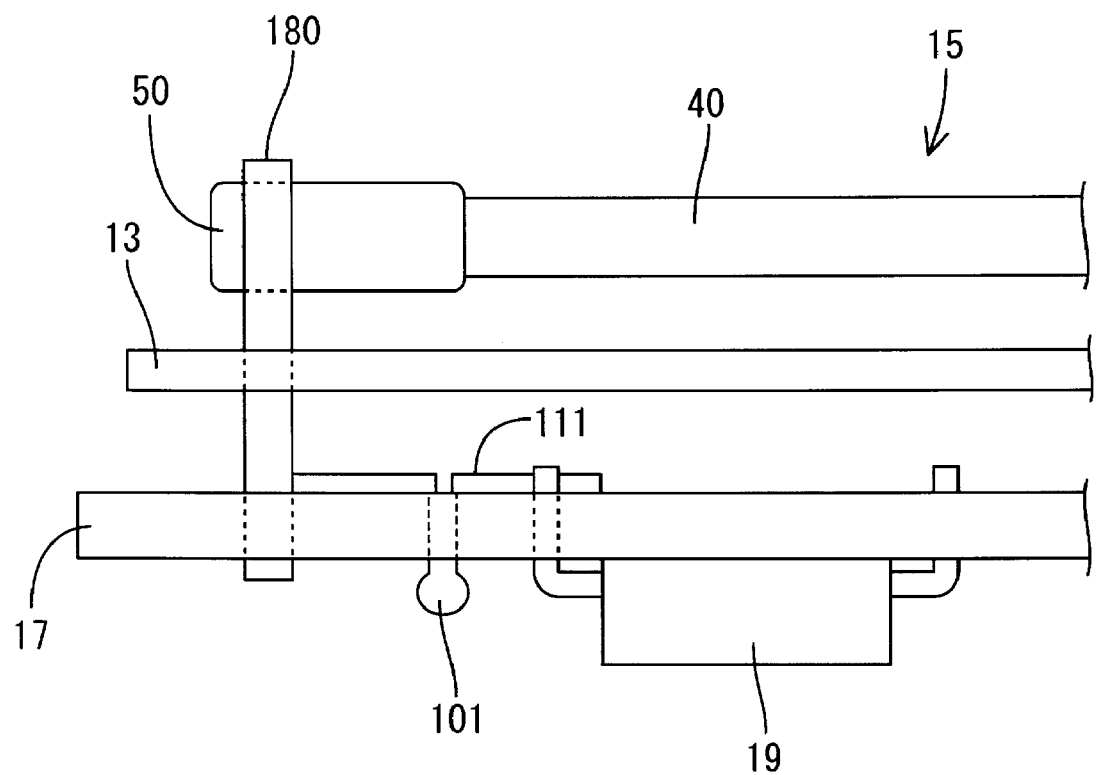
FIG. 8 is an explanatory diagram schematically showing a modification of the drive power supply structure for discharge tubes.
Figure 9:
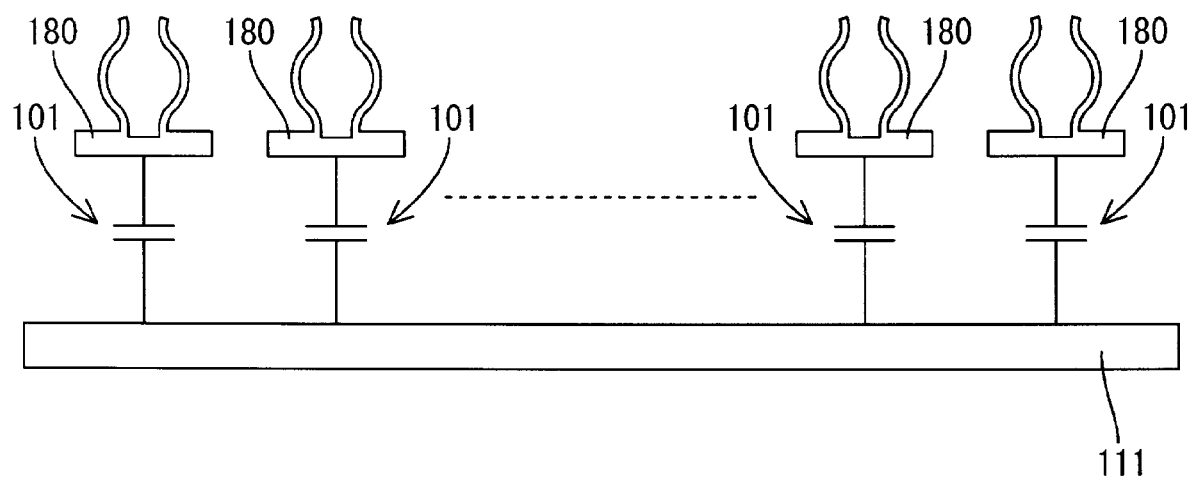
FIG. 9 is a schematic diagram separately showing the construction of the supply structure shown in FIG. 8.
Figure 10:
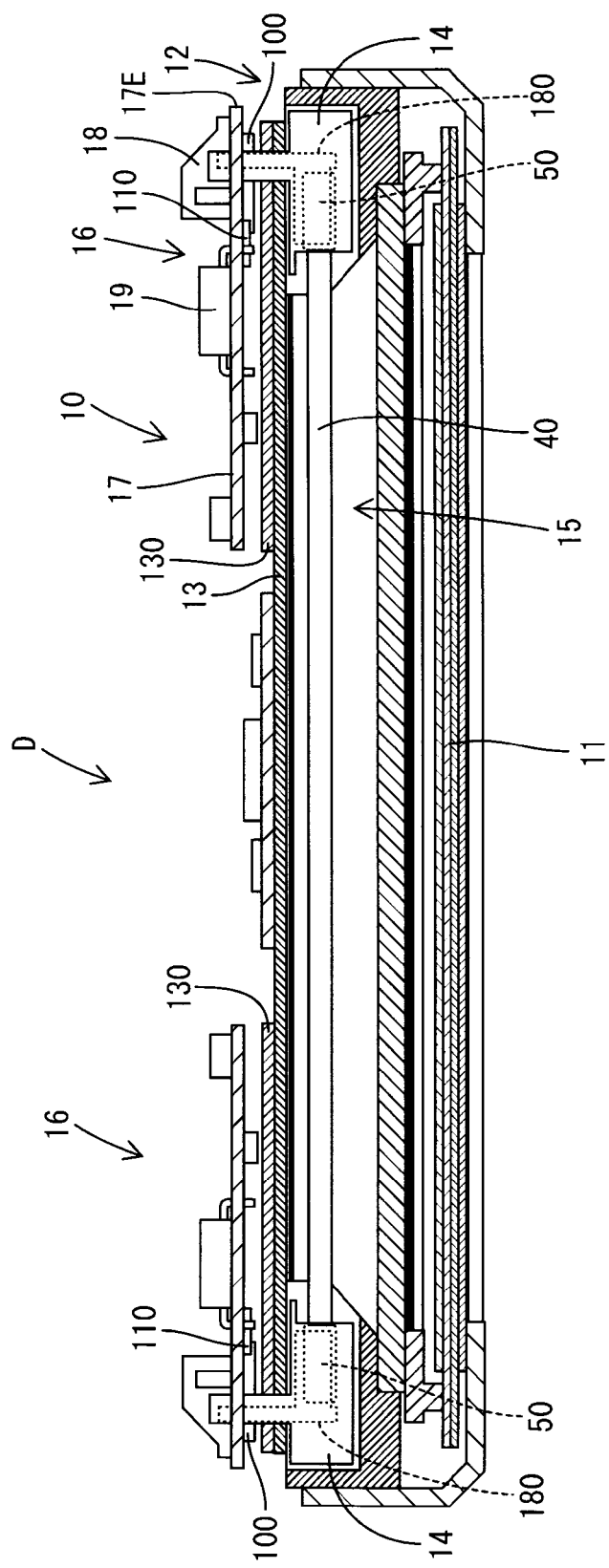
FIG. 10 is a horizontal sectional view of a modification of the liquid crystal display device.

FIG. 8 is an explanatory diagram schematically showing a modification of the drive power supply structure for discharge tubes 15. FIG. 9 is a schematic diagram separately showing the construction of the supply structure. FIG. 10 is a horizontal sectional view of a modification of the liquid crystal display device D. FIG. 11 is an exploded perspective view of an embodiment of a television receiver.

The liquid crystal display device D shown in FIG. 1 preferably has a horizontally-elongated rectangular shape as a whole, which includes a display panel 11 and a lighting device 10 as shown in FIG. 1. The display panel 11 is disposed on the front side of the lighting device 10, so that the lighting device 10 as a backlight can optically illuminate the display panel 11 from the back.

The liquid crystal display D can be applied to a television receiver. As shown in FIG. 11, the television receiver includes the liquid crystal display D, and front and back cabinets Ca and Cb capable of holding the liquid crystal display device D therebetween. Further included are a power source P other than a power board 16 described below, a tuner T and a stand S.

The display panel 11 has a well-known construction, in which liquid crystal as a material with an optical property that changes with applied voltage is filled between a transparent TFT substrate and a transparent CF substrate. TFTs (Thin Film Transistors), as switching elements connected to source wiring lines and gate wiring lines arranged at right angles relative to each other, and pixel electrodes are provided on the TFT substrate. A color filter, on which color sections of three primary colors, i.e., Red (R), Green (G) and Blue (B), are arranged in a matrix, and the opposite electrodes are provided on the CF substrate.

The lighting device 10 includes a lamp unit 12 and power boards 16, as shown in FIG. 2 in detail.

The lamp unit 12 includes a metallic chassis 13, which forms a horizontally-elongated rectangular plate as a whole and functions as a reflector plate. Further included are a plurality of discharge tubes 15 vertically arranged on the front side of the chassis 13 and held in a horizontal position, and a plurality of relay connectors 14 which are vertically arranged along the lateral edges of the chassis 13 so as to correspond to the respective discharge tubes 15.

The power boards 16 are disposed on the back side of the chassis 13 so as to supply power to the discharge tubes 15 via the relay connectors 14.

A plurality of mounting holes 13H corresponding to the ends of the discharge tubes 15 are formed through the chassis 13 so as to extend from the front side to the back side, and are arranged vertically so as to be level with the respective discharge tubes 15. The relay connectors 14 are mounted through the respective mounting holes 13H. Each relay connector 14 includes a metallic holder (holder electrode) 180 having conductivity. The discharge tube 15 can be mounted to the chassis 13 via the holder 180.

As shown in FIG. 7, the holder 180 can be formed as a clip, for example, so as to be able to hold a ferrule (a terminal) 50 provided on the end of the discharge tube 15. That is, a pair of elastic locking elements is provided so that the discharge tube 15 can be freely inserted into or removed from the holder 180 due to elastic deformation of the elastic locking parts.

The holder 180 is inserted into the mounting hole 13H from the front side of the chassis 13, and fixed to the chassis 13. The front end portion of the holder 180 projects from the front side of the chassis 13 while the back end portion thereof projects from the back side of the chassis 13, when the holder 180 is attached to the chassis 13. The back end portion of the holder 180 is connected to the power board 16 in order to form an electrical connection. Note that the holder 180 has conductivity as described above. Therefore, as well as having a function for holding the discharge tube 15, the holder 180 functions as an electrode, through which the discharge tube 15 is electrically connected to the power board 16 so that drive power can be supplied to the discharge tube 15.

As shown in FIGS. 2 and 3, openings 13a are formed on some areas of the chassis 13. The openings 13a are arranged on the chassis 13 so as to overlap with or be opposed to the power boards 16. Thereby, isolation between the power boards 16 and the inside of the chassis 13 can be achieved.

Referring to FIG. 6, each discharge tube 15 is formed as a cold cathode fluorescent tube having discharge gas in a glass tube, which includes the generally elongated straight glass tube 40 having a circular cross section, elongated outer leads 42 projecting linearly from the respective ends of the glass tube 40 and coaxially with the glass tube 40, and ferrules 50 attached to the respective end portions of the glass tube 40. Each ferrule 50 includes a body 51 and a conductive portion 57, and can be formed by bending or hammering, using a metallic (e.g., copper alloy) plate that is formed into a predetermined shape by punching. The body 51 preferably has a substantially cylindrical shape as a whole, and is mounted to the periphery of the glass tube 40. The conductive portion 57 extends from the end edge of the body 51 so as to have elastic contact with the periphery of the outer lead 42, and is fixed by welding.

As shown in FIG. 7, each discharge tube 15 having the above construction can be fitted into the holders 180 on its respective ends, so as to be mounted to the chassis 13. The holders 180 have elastic contact with the peripheries of the bodies 51 of the respective ferrules 50, so that drive power can be supplied thereto via the holders 180. That is, each ferrule 50 forms a power connecting terminal (a terminal) of the discharge tube 15. Thus, installation and electrical connection of the discharge tube 15 can be completed merely by fitting its ferrules 50 into the holders 180.

On the other hand, as shown in FIGS. 1, 3 to 5, each power board 16 disposed on the back side of the chassis 13 includes a base member 17 having a circuit formed on its back side (i.e., on the opposite side of the chassis 13), an inverter circuit component 19 mounted on the back side of the base member 17, and a plurality of on-board connectors 18 mounted on the back side of the base member 17. The inverter circuit component 19, i.e., a circuit component for providing drive power for the discharge tubes 15 in the present preferred embodiment, has a function for adjusting the supply voltage to (or generating a higher voltage of) a predetermined voltage level.

The base member 17 preferably has a vertically-elongated rectangular shape as a whole, and is preferably formed using a phenolic paper-base copper-clad laminated board (known as a phenolic paper). A plurality of fitting holes 17H preferably having a vertically-elongated rectangular shape are formed through the base member 17 so as to extend from the front side to the back side. The plurality of fitting holes 17H are arranged vertically along the lateral side edge 17E (i.e., outer side edge) of the base member 17 so as to correspond to the relay connectors 14. Further, a plurality of locating holes 17a are formed through the base member 17 so as to extend from the front side to the back side. The locating holes 17a are arranged between the fitting holes 17H and the lateral side of the base member 17 so that a pair of upper and lower locating holes corresponds to each fitting hole 17H.

The on-board connectors 18 are arranged along the lateral side of the base member 17 so as to correspond to the respective fitting holes 17H, and are engaged with the respective relay connectors 14 through the fitting holes 17H. Each on-board connector 18 includes a housing 60 (See FIG. 4) made of an insulating material such as a synthetic resin, and the holder 180 held in the housing 60.

The holders 180 are electrically connected to the inverter circuit component 19 within the base member 17. As described above, the holders 180 function as electrodes through which drive power is supplied to the discharge tubes 15, while holding the discharge tubes 15 within the chassis 13.

Specifically, as shown in FIG. 5, a common electrode 110 is provided so that the inverter circuit component 19 is allowed to provide drive power concurrently for the holders 180. The drive power is supplied from the common electrode 110 individually to the holders 180 via a dielectric film 100.

The common electrode 110 is preferably formed of a conductive thin film such as an aluminum film. The dielectric film 100 is preferably formed of a thin film made of an insulating material such as ceramics. The dielectric film 100 is shared by the holders 180, and therefore is formed solidly so as to extend across the holders 180.

The plurally-arranged discharge tubes 15 differ in electrical potential, and therefore drive power supplied thereto should differ in level. Generally, inverter circuit components 19 should be provided individually for the respective discharge tubes 15, in order to provide drive power at different levels for the discharge tubes 15 (i.e., for the holders 180 in the present preferred embodiment).

However, in the present preferred embodiment, drive power from the common electrode 110 is supplied, via the dielectric film (dielectric portion) 100, to the holders 180 that function as electrodes of the discharge tubes 15. Therefore, the drive power can be supplied at a fixed level to the common electrode 110. That is, the discharge tubes 15 can share the inverter circuit component 19. In the present preferred embodiment, as shown in FIG. 3, an inverter circuit component 19 is provided on each of four power boards 16, which are provided on the back side of the chassis 13.

Specifically, a capacitor is formed of the dielectric film 100 disposed between the holder (the holder electrode) 180 and the common electrode 110, as shown in FIG. 7. The capacitor can adjust (or limit) the drive power to be supplied to the discharge tube 15, to a predetermined voltage level. Due to the capacitors thus formed, the discharge tubes 15 form a system capable of being driven in parallel. That is, the drive therefor can be achieved by use of a common inverter circuit component 19 as a power source.

The liquid crystal display device D of the present preferred embodiment having the above construction develops the following operational effects.

In the lighting device 10, the holders 180 for holding the discharge tubes 15 function as electrodes on the route of drive power supply for the discharge tubes 15. Further, the holders 180 are directly connected to the power boards 16 disposed on the back side of the chassis 13. According to this construction, a harness for power supply can be eliminated, and the power-supply-related construction can be greatly simplified. Further, mounting of the discharge tubes 15 and wiring therefor can be significantly facilitated.

The drive power is supplied from the common electrode 110 to the holders 180 via the dielectric film 100, and consequently the discharge tubes 15 can be driven in parallel. That is, parallel drive for the discharge tubes 15 can be allowed due to a capacitance formed between a power source (e.g., the inverter circuit component 19 in the present preferred embodiment) and each discharge tube 15. Specifically, the drive power is supplied to the common electrode 110 at a common voltage level, while the drive power therefrom is supplied, via the dielectric film 100, individually to the respective holders 180 and therefore to the respective discharge tubes 15 which are connected in parallel thereto. According to this construction, a capacitance formed of the dielectric film 100 disposed between the common electrode 110 and the holders 180 can adjust (or limit) the voltage level, so that the drive power is supplied to each holder 180 at a proper level. Thus, according to the present preferred embodiment, parallel drive for the discharge tubes 15 can be achieved by a simple construction including the holders 180, resulting in contribution to large cost reduction.

Further, in the present preferred embodiment, the holders 180 are provided on the respective ends of each discharge tube 15, as shown in FIG. 7. Thereby, the voltage is applied to each discharge tube 15 in a balanced manner, resulting in improved luminous efficiency.

In the present preferred embodiment, the chassis 13 of the liquid crystal display device D includes openings 13a, which are formed so as to overlap with the power boards 16. Thereby, electrical leakage from the power boards 16 into the chassis 13 can be prevented or suppressed. That is, the power boards 16 generate or provide a high-frequency voltage, and therefore electrical leakage, or the like, into the chassis 13 can be prevented or suppressed by forming the openings 13a on the chassis 13. The openings 13a further have a function for preventing heat conduction from the power boards 16 prone to high temperature into the chassis 13.

Alternatively, the prevention of electrical leakage and heat conduction can be achieved by concave portions lower than the rest thereof, which are formed on the chassis 13 so as to overlap with the power boards 16.

This is the end of explanation of the present preferred embodiment of the present invention. However, the present invention is not limited to the preferred embodiment explained in the above description made with reference to the drawings. The following preferred embodiments may be included in the technical scope of the present invention, for example.

(1) A capacitor chip 101 may be disposed between the common electrode 111 and each holder 180, as shown in FIG. 8. That is, the dielectric film 100 is disposed between the common electrode 111 and the holders 180 in the preferred embodiment shown in FIG. 1, in order to provide a capacitance capable of adjusting (or limiting) the voltage level applied to each discharge tube 15. Alternatively, the capacitance may be formed of a capacitor chip 101.

If the capacitances are thus formed of capacitor chips 101, manufacturing efficiency can be improved, resulting in contribution to cost reduction.

Note that the capacitances 101 are preferably provided so as to correspond one-to-one with the holders 180 as shown in FIG. 9, in this case.

(2) The electrical and heat isolation between the power boards 16 and the chassis 13 can be achieved by electrical and heat insulating members 130, as shown in FIG. 10. That is, the electrical and heat isolation between the power boards 16 and the chassis 13 is achieved by forming the openings 13a on the chassis 13, in the preferred embodiment shown in FIG. 1. Alternatively, the electrical and heat isolation may be achieved by providing the electrical and heat insulating members 130 therebetween. In this case, preferably, members made of ceramics such as alumina are used as the electrical and heat insulating members 130.

(3) The base member 17 of each power board 16 is not limited to a phenolic paper-base copper-clad laminated board, but rather may be formed of a plate made of glass epoxy or ceramics.

(4) The display panel 11 of the liquid crystal display device D is not limited to having TFTs as switching elements, but rather may include, as switching elements, elements other than TFTs such as MIM (Metal Insulator Metal) elements.

(5) The display device of the present invention is not limited to the liquid crystal display device. Various display devices requiring a lighting device on the back side of a display panel can be included.

Figure 12:
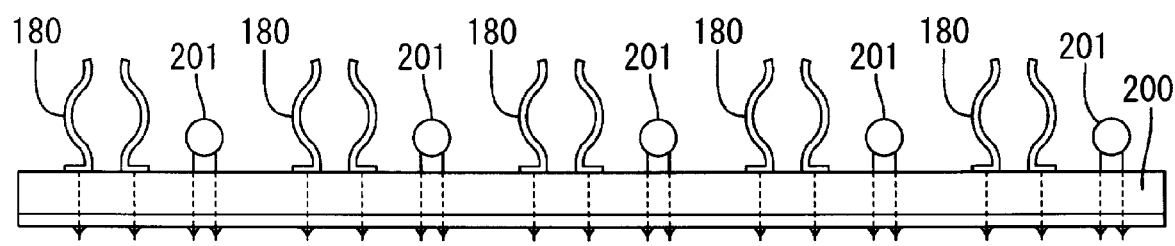
FIG. 12 is an explanatory diagram schematically showing a modification of the drive power supply structure for discharge tubes.

(6) As shown in FIG. 12, the capacitive coupling between the common electrode and each holder (holder electrode) 180 can be achieved by mounting a chip capacitor (dielectric element) 201 as a dielectric portion on the circuit board (paper phenol substrate) 200. In this case, holders (holder electrodes) 180 are mounted on a first surface of the circuit board 200, and the chip capacitors 201 are also mounted on the first surface so as to correspond one-to-one with the holders 180. Further, the common electrode is provided on the first surface, so as to be connected to the chip capacitors 201 on the first surface. Each holder 180 is connected to the corresponding chip capacitor 201. Thus, the common electrode is electrically connected to each holder 180 via the chip capacitor 201.

Figure 13:
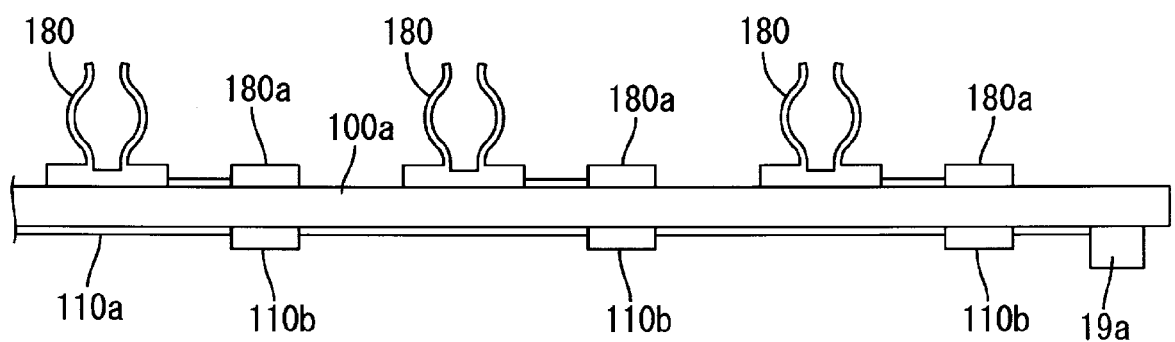
FIG. 13 is an explanatory diagram schematically showing another modification of the drive power supply structure for discharge tubes.
Figure 14:
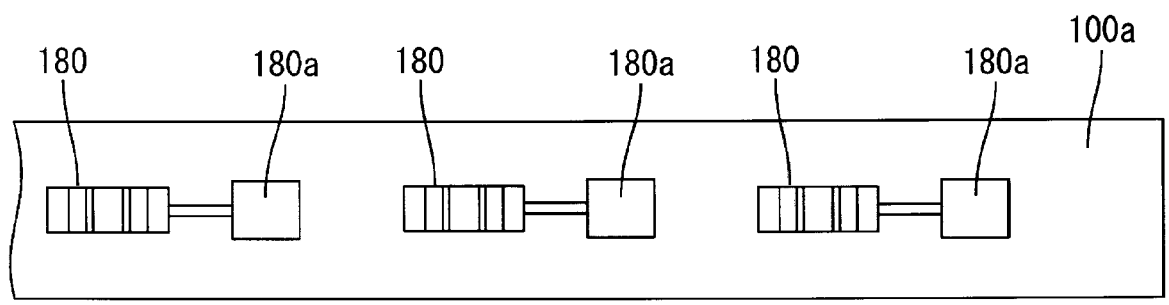
FIG. 14 is a top plan view of FIG. 13.
Figure 15:
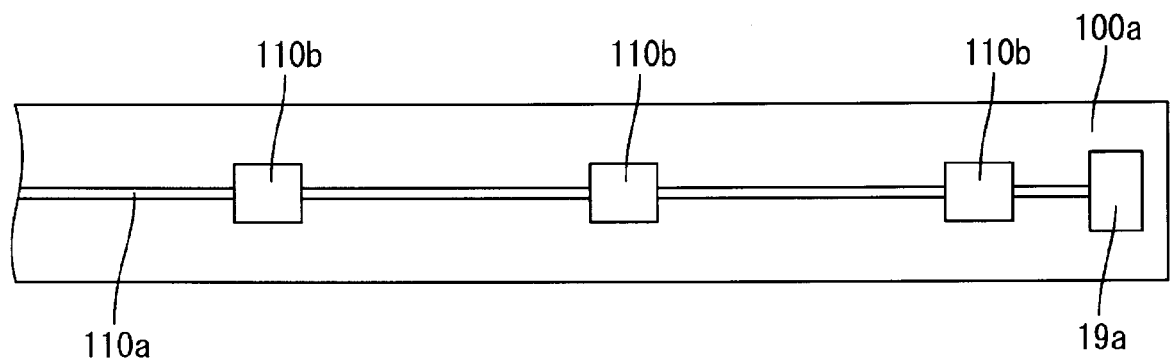
FIG. 15 is a bottom plan view of FIG. 13.

(7) As shown in FIG. 13, the electrical connection between the common electrode 110a and each holder (holder electrode) 180 can be formed by use of a circuit board (a glass-epoxy substrate) 100a as a dielectric portion. In this case, holders 180 and first-capacity electrodes 180a equipotent to the respective holders 180 are formed on a first surface of the circuit board 100a, as shown also in FIG. 14. Second-capacity electrodes 110b arranged on the opposite side of the circuit board 100a from the first-capacity electrodes 180a (i.e., on a second surface of the circuit board 100a), and the common electrode (a common wiring line) 110a equipotent to the second-capacity electrodes 110b are also formed on the second surface, as shown also in FIG. 15. On the second surface of the circuit board 100a, the common electrode 110a is electrically connected to the terminal 19a of the inverter board 19.

Figure 16:
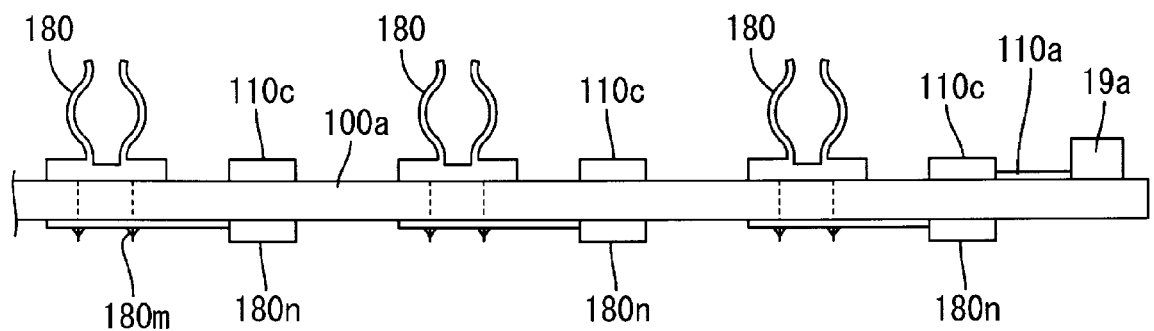
FIG. 16 is an explanatory diagram schematically showing another modification of the drive power supply structure for discharge tubes.
Figure 17:
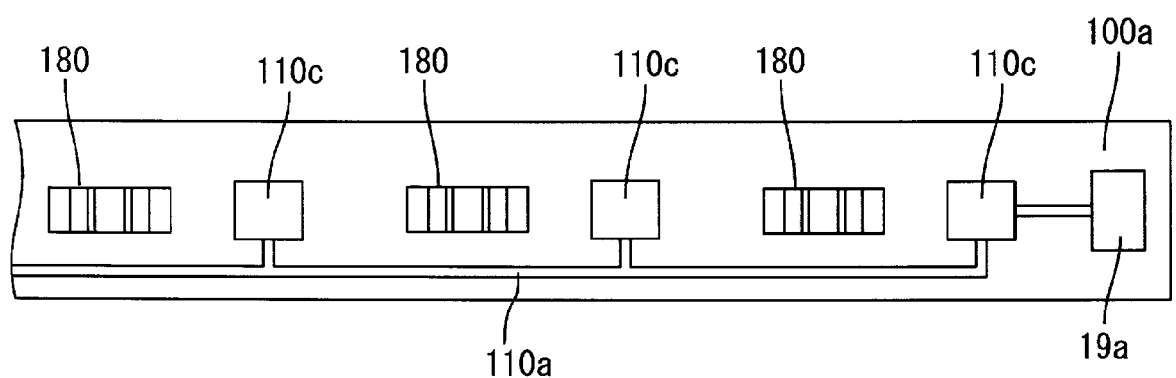
FIG. 17 is a top plan view of FIG. 16.
Figure 18:
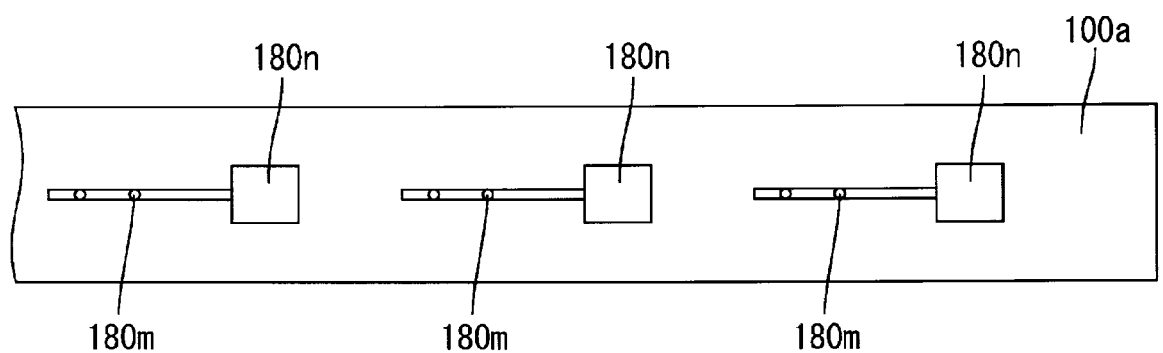
FIG. 18 is a bottom plan view of FIG. 16.

(8) As shown in FIG. 16, the electrical connection between the common electrode 110a and each holder (holder electrode) 180 can be formed by use of a circuit board (a glass-epoxy substrate) 100a as a dielectric portion. In this case, holders 180, first-capacity electrodes 110c disconnected from the holders 180, and the common electrode (a common wiring line) 110a equipotent to the first-capacity electrodes 110c are formed on a first surface of the circuit board 100a, as shown also in FIG. 17. On the first surface of the circuit board 100a, the common electrode 110a is electrically connected to the terminal 19a of the inverter board 19. On the other hand, the lead wires (connecting terminal portions) 180m of the holders 180 penetrating the circuit board 100a from the first surface side, and second-capacity electrodes 180n connected to the lead wires 180m so as to be equipotent to the respective holders 180, are formed on a second surface of the circuit board 100a, as shown also in FIG. 18. Thus, the parallel coupling can be readily achieved by forming a wiring pattern on the circuit board 100a so that the capacitors are provided. In the construction shown in FIG. 16, the circuit board 100a is disposed on the inner side of the chassis 13 (i.e., on the same side as the light sources), and the lead wires 180m and the second-capacity electrodes 180n on the second surface of the circuit board 100a are isolated from the chassis 13. Specifically, the isolation can be achieved by forming slit-like openings on the chassis 13, which are opposed to the lead wires 180m and the second-capacity electrodes 180n. Further, note that the common electrode 110a on the first surface is wired so as to bypass the holders 180 for isolation therefrom.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lighting device for a display device comprising:
   a plurality of light sources, each of the plurality of light sources including:
      a glass tube;
      an outer lead projecting from an end portion of the glass tube; and
      a ferrule that is electrically connected to the outer lead and that is mounted to the end portion of the glass tube;
   a power source arranged to provide drive power for the plurality of light sources;
   a common electrode arranged to supply the drive power to the plurality of light sources;
   a plurality of holder electrodes arranged to hold the plurality of light sources and to supply the drive power from the common electrode to a corresponding one of the plurality of light sources;
   a dielectric portion provided between the common electrode and each of the plurality of holder electrodes; and
   a common substrate on which the common electrode, the plurality of holder electrodes, and the dielectric portion are provided.

2. A lighting device for a display device as in claim 1, wherein the dielectric portion includes chip capacitors.

3. A lighting device for a display device as in claim 2, wherein the chip capacitors correspond one-to-one with each of the plurality of holder electrodes.

4. A lighting device for a display device as in claim 1, further comprising:
   a chassis arranged to hold the plurality of light sources; and
   an insulating member provided between the chassis and the common substrate.

5. A lighting device for a display device as in claim 1, wherein the common electrode is arranged to supply the drive power concurrently to the plurality of light sources.

6. A lighting device for a display device as in claim 1, wherein the plurality of light sources includes a plurality of discharge tubes.

7. A lighting device for a display device as in claim 1, wherein the power source includes an inverter circuit arranged to provide a high-frequency voltage.

8. A lighting device for a display device as in claim 1, wherein:
   each of the plurality of holder electrodes is arranged to hold the ferrule and provide the drive power to the plurality of light sources via the ferrule.

9. A lighting device for a display device as in claim 1, wherein:
   each of the plurality of holder electrodes includes a conductive clip member arranged to hold the ferrule.

10. A lighting device for a display device as in claim 1, wherein:
    the plurality of light sources includes a linear light source;
    the ferrules are provided on respective ends of each of the plurality of the linear light sources to receive the drive power; and
    one of the plurality of holder electrodes is provided for each of the ferrules on the respective ends.

11. A display device comprising:
    a lighting device for a display device as in claim 1; and
    a display panel arranged to provide display by use of light from the lighting device for a display device.

12. A display device as in claim 11, wherein the display panel is a liquid crystal panel that includes liquid crystal.

13. A television receiver comprising a display device as in claim 11.

* * * * *